(12) United States Patent
Daniell

(10) Patent No.: US 7,624,347 B2
(45) Date of Patent: Nov. 24, 2009

(54) SYSTEM AND METHOD FOR FORWARDING FULL HEADER INFORMATION IN EMAIL MESSAGES

(75) Inventor: W. Todd Daniell, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1058 days.

(21) Appl. No.: 10/327,417

(22) Filed: Dec. 20, 2002

(65) Prior Publication Data
US 2004/0051735 A1 Mar. 18, 2004

Related U.S. Application Data

(60) Provisional application No. 60/411,336, filed on Sep. 17, 2002, provisional application No. 60/416,916, filed on Oct. 8, 2002, provisional application No. 60/419,613, filed on Oct. 17, 2002, provisional application No. 60/425,935, filed on Nov. 13, 2002, provisional application No. 60/426,437, filed on Nov. 14, 2002.

(51) Int. Cl.
G06F 3/00 (2006.01)
G06F 15/16 (2006.01)
(52) U.S. Cl. ........................... 715/752; 709/206
(58) Field of Classification Search .............. 715/752, 715/751; 709/206
See application file for complete search history.

(56) References Cited

U.S. PATENT DOCUMENTS

| | | | | |
|---|---|---|---|---|
| 5,539,530 | A * | 7/1996 | Reifman et al. | 358/402 |
| 6,707,472 | B1 * | 3/2004 | Grauman | 715/752 |
| 6,785,712 | B1 * | 8/2004 | Hogan et al. | 709/206 |
| 6,823,368 | B1 * | 11/2004 | Ullmann et al. | 709/206 |
| 6,938,065 | B2 * | 8/2005 | Jain | 709/201 |
| 7,228,334 | B1 * | 6/2007 | Jordan, Jr. | 709/206 |
| 7,373,607 | B2 | 5/2008 | Daniell | |
| 2002/0126146 | A1 * | 9/2002 | Burns et al. | 345/752 |
| 2002/0147986 | A1 * | 10/2002 | Michael et al. | 725/110 |
| 2002/0175939 | A1 * | 11/2002 | Iwasa | 345/752 |

OTHER PUBLICATIONS

W. Todd Daniell, Non Final Office Action, mailed Feb. 1, 2007, filing date Jun. 3, 2003 U.S. Appl. No. 10/453,751.
W. Todd Daniell, Notice of Allowance and Fees, mailed Sep. 27, 2007, filing date Jun. 3, 2003 U.S. Appl. No. 10/453,751.
W. Todd Daniell, U.S. Appl. No. 10/453,751, filed Jun. 3, 2003.
Presentation by Paik, Eun Kyoung; Entitled: impp, simple, prim, iptel (CPL), sigtran (SCTP), on Apr. 22, 2002.
By J. Rosenbert; Entitled: A Component Model for SIMPLE, pp. 1-11, Feb. 22, 2002.
By J. Oikarinen, D. Reed; Entitled: Internet Relay Chat Protocol; pp. 1-65, May 1993.
Web Address: www.jabber.org; for: Jabber software Foundation, entitled: Open Instant Messaging Powered by XMPP; pp. 1-3, Apr. 23, 2003.
By R. Osborne, S. Aggarwal, L. Wong, P. Beebee, M. Calsyn, L. Lippert; Entitled: RVP: A Presence and Instant Messaging Protocol; pp. 1-37, Dec. 10, 2002.

(Continued)

Primary Examiner—Ting Zhou
(74) Attorney, Agent, or Firm—Ed Guntin; Paul Neils; Akerman Senterfitt

(57) ABSTRACT

Systems and methods for forwarding full header information in email messages are presented. When an email message is received by a user, and the user chooses to forward the received email message, an option is provided to the user to either include the full header information of the received email in the forwarded email, or to not include the full header information of the received email in the forwarded email. The option may be presented to the user as a user-selectable option, such as a check box that the user can select or de-select.

16 Claims, 6 Drawing Sheets

OTHER PUBLICATIONS

By J. Rosenberg, H. Schulzrinne; Entitled: SIP Event Packages for Call Leg and Conference State; pp. 1-23, Mar. 1, 2002.

Web Address: www.ceruleanstudios.ocm/trillian; pages included: Features Tour (1), Messaging Enhancements (2), Connect to 5 Mediums (2), Interface Overview (1), Features Tour (Screenshots Gallery—Contact List Window) (1) Features Tour (Screenshots Gallery—Sending Pictures) (1), Features Tour (Screenshots Gallery—Message Window) (1), Apr. 23, 2003.

Comments on Information Disclosure Statement, May 20, 2003.

Daniell; U.S. Appl. No. 11/960,338 filed Dec. 19, 2007 (Note: Copy not provided as it is a part of PTO records).

Daniell; Advisory Action mailed Apr. 9, 2008 for U.S. Appl. No. 10/453,751 filed Jun. 3, 2003 (Note: Copy not provided as it is a part of PTO records).

Daniell; Examiner Interview Summary Record mailed Nov. 14, 2007 for U.S. Appl. No. 10/453,751 filed Jun. 3, 2003 (Note: Copy not provided as it is a part of PTO records).

Daniell; Notice of Allowance and Fees Due mailed Apr. 9, 2008 for U.S. Appl. No. 10/453,751 filed Jun. 3, 2003 (Note: Copy not provided as it is a part of PTO records).

Daniell; Advisory Action mailed Apr. 9, 2008 for U.S. Appl. No. 10/453,751 filed Jun. 3, 2003 (Note: Copy not provided as part of PTO file).

Daniell; Notice of Allowance and Fees Due mailed Apr. 9, 2008 for U.S. Appl. No. 10/453,751 filed Jun. 3, 2003 (Note: Copy not provided as part of PTO file).

* cited by examiner

SYSTEM AND METHOD FOR FORWARDING FULL HEADER INFORMATION IN EMAIL MESSAGES

CROSS REFERENCE TO RELATED APPLICATIONS

This application claims the benefit of U.S. provisional patent application Ser. No. 60/411,336, filed Sep. 17, 2002; No. 60/416,916, filed Oct. 8, 2002; No. 60/419,613, filed Oct. 17, 2002; and No. 60/426,437 filed Nov. 14, 2002. These provisional patent applications are incorporated herein by reference in their entireties.

This application also claims the benefit of U.S. provisional patent application Ser. No. 60/425,935, filed Nov. 13, 2002.

Additionally, U.S. patent application Ser. No. 10/274,408, filed Oct. 18, 2002; Ser. No. 10/274,478, filed Oct. 18, 2002; and Ser. No. 10/274,405, filed Oct. 18, 2002, are also incorporated herein by reference in their entireties.

FIELD OF INVENTION

The present invention relates generally to the email and, more particularly, to systems and methods for forwarding full header information in email messages.

BACKGROUND

In many email systems, when a user receives an email message, the user is provided an option that permits the user to read the received email message. Typically, if the user chooses to read the received email message, then the received email message is displayed to the user at an email read window. In many email systems, when a recipient receives an email message, much of the header information is hidden from the recipient. Thus, a recipient typically only sees a sender's name and email address, a subject line, and names and email addresses of other recipients if the email message is courtesy copied (cc) to other recipients.

From the email read window, the user is usually provided a number of options including the option to delete the email message, reply to the email message, print the email message, or forward the email message to a third person. When the user chooses t forward the received email message to a third person, the full header information of the received email message is normally removed, and a truncated header is placed in the message. The truncated header typically includes the name and email address of the original sender of the message, the subject line, the date of forwarding, and the person forwarding the email. Thus, the truncated header removes much of the information that is originally present in the full header information, thereby simplifying the header information.

Unfortunately, the truncated header is insufficient for certain purposes, such as reporting email abuse or tracing email for security purposes. Thus, when a recipient of an email wishes to report email abuse or wishes to trace an email, a systems administrator or security personnel typically needs the full header information of the received email.

For these types of situations where the full header information is needed, different options for viewing the email message are selected until the full header information is visible. Once the full header information is visible, the user typically copies the full header information into a buffer, and manually pastes the full header information into an email message to send to security personnel or a systems administrator.

The manual cutting and pasting of the full header information is an inconvenient process that is also prone to human error. There is, therefore, a need in the art to address this deficiency.

SUMMARY

The present invention provides systems and methods for forwarding full header information in email messages.

Briefly described, in architecture, one embodiment of the system comprises a user interface having an email message forwarding screen, and a user-selectable option on the email message-forwarding screen. The user selectable option is either an option to include full header information of a received email message in a forwarded email message, or an option to not include full header information of a received email message in a forwarded email message.

The present disclosure also provides methods for integrating instant messaging (IM) services and email services.

In this regard, one embodiment of the method comprises the steps of receiving an email message having full header information, and receiving an input to forward the received email message. One embodiment of the method further comprises the step of providing user-selectable options in response to receiving the input to forward the received email message. The user-selectable options being either an option to include the full header information of the received email message in the forwarded email message, or an option to not include the full header information of the received email message in the forwarded email message.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1A:
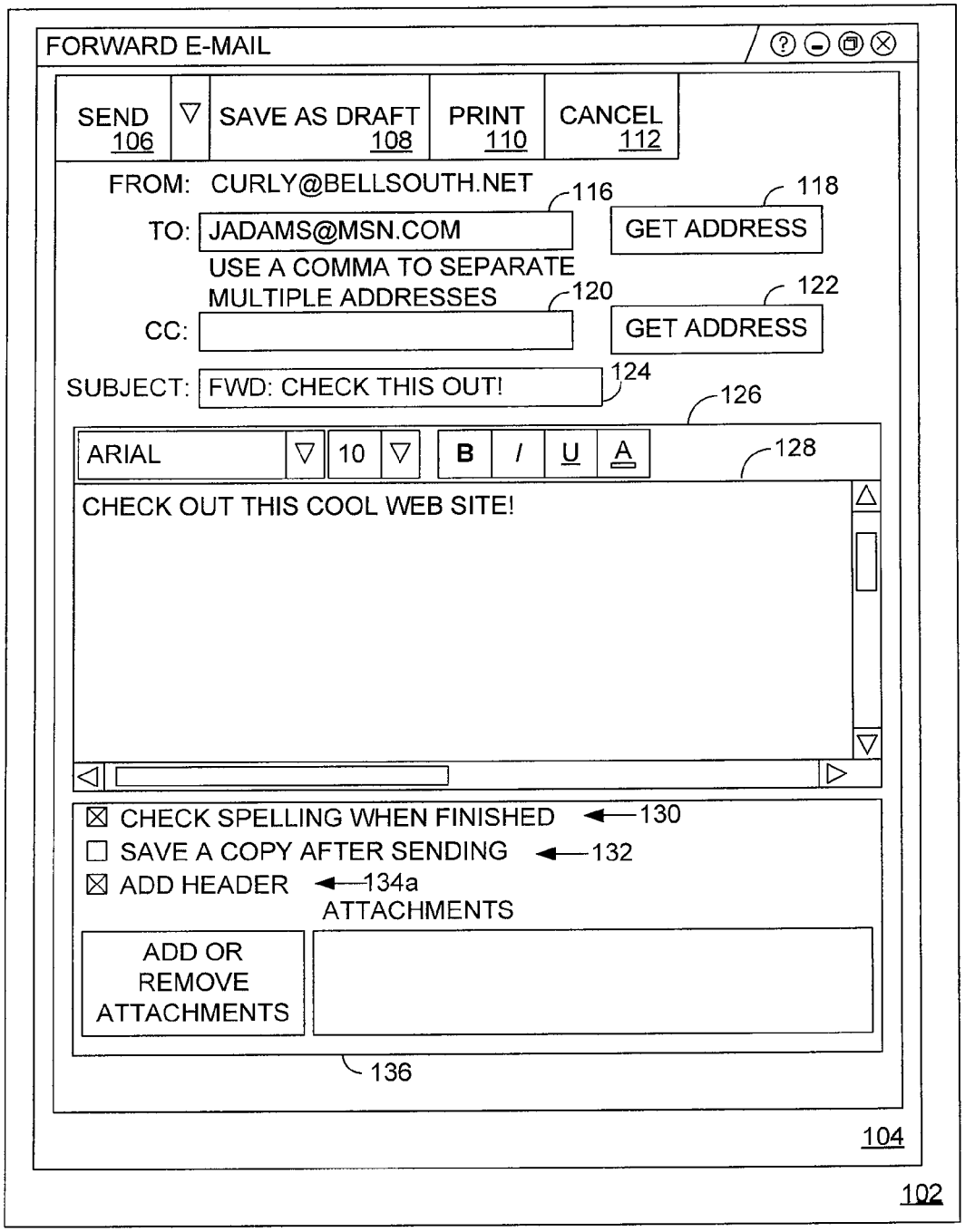
FIGS. 1A and 1B are diagrams showing a user interface having a user-selectable option for including or excluding full header information in a forwarded email.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Figure 1B:
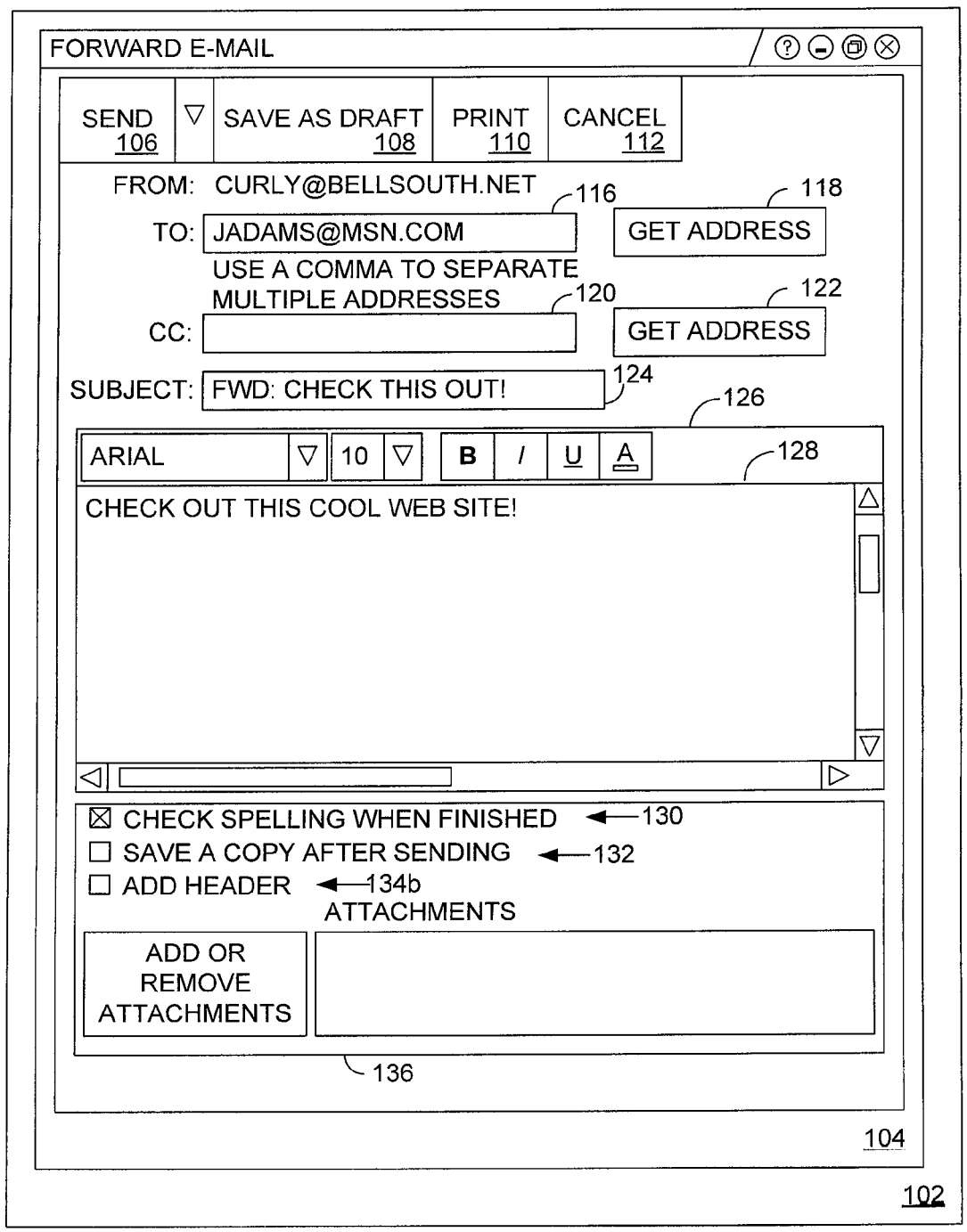

FIGS. 1A and 1B are diagrams showing a user interface 102 having a user-selectable option 134 for including or excluding full header information in a forwarded email message. FIG. 1A shows the user interface 102 having the user-selectable option 134a selected by the user to include the full header information of the received email message in a forwarded email message. Conversely, FIG. 1B shows the user interface 102 having the user-selectable option 134b selected by the user to not include the full header information of the received email message in the forwarded email message.

Upon receiving and opening an email message, a user may wish to forward the email message to security personnel or a systems administrator if the email message has offensive content (e.g., pornography, unsolicited bulk mail, virus, etc.). When the user chooses to forward the received email message, a user interface 102 having an email-forwarding window 104 is displayed to the user. As shown in FIG. 1A, the user interface 102 comprises a recipient email address input box 116 to which the user may enter a recipient's email address. In one embodiment, the user interface 102 further comprises an email address retrieval con 118 that, upon selection by the user, displays a list of email addresses so that the user may select one of the displayed email addresses as the recipient's email address. Since similar email address retrieval icons are known in the art, further discussion of email address retrieval icons is omitted here.

In addition to the email address input box 116, the user interface 102 comprises a subject line input box 120, which permits a user to enter a subject or title of an email message. As shown in the specific example of FIG. 1A, the user has titled the email message as "FWD: SPAM EMAIL ABUSE" to indicate that the email message is a forwarded message that relates to email abuse.

Additionally, the user interface 102 may comprise a send button 106, a save button 108, a print button 110, and a cancel button 112. The send button 106 is a user-selectable icon that is displayed at the user interface 102, which permits the user to send the email message to a recipient. Thus, when the user selects the send button 106, the email message on the user interface is forwarded (i.e., sent) to the recipient as designated in the email address input box 116. The save button 108 is a user-selectable icon that is displayed at the user interface 102, which permits the user to save the email message. Thus, when the user selects the save button 108, the email message is saved to a file. The print button 110 is a user-selectable icon that is displayed at the user interface 102, which permits the user to print the email message. Thus, when the user selects the print button 110, the email message at the user interface 102 is printed to a local or network printer (not shown). The cancel button 112 is a user-selectable icon that permits the user to cancel the forwarding of the email message. Thus, when the user selects the cancel button 112, the email-forwarding window 104 is closed. Since the save button 108, the send button 106, the print button 110, and the cancel button 112 are known in the art, further discussion of these various user icons is omitted here.

The user interface 102 also comprises a text window 128 in which the user may enter a text message. Since the user interface 102 of FIG. 1A is configured for forwarding email messages, the text window 128 includes the text of the originally received message that is being forwarded by the user. Additionally, the user interface 102 may comprise an option bar 126, which permits the user to alter the font of the message in the text window 128. Also, an attachments icon 136 may be present on the user interface 102, thereby permitting the user to attach various files to the email message. In addition to the text window 128, the option bar 126, and the attachments icon 136, the user interface 102 may further comprise a spell-check icon 130 and a save copy icon 132, which are user-selectable icons that toggle on and off depending on whether the user chooses to check spelling or save a copy of the forwarded email message. Since the text window 128, the option bar 126, and the attachments icon 136, the spell-check icon 130, and the save copy icon 132 are well known in the art, further discussion of these items is omitted here.

Unlike prior-art user interfaces for forwarding email messages, the user interface 102 of FIG. 1A also comprises a user-selectable option 134a on the email forwarding screen 104, which permits the user to select the option of including full header information of the received email message in the forwarded message, or the option of not including full header information of the received email message in the forwarded message. In one embodiment, the user-selectable option 134 may be an icon configured to toggle between the option to include the full header information and the option to not include the full header information. In this regard, if the user selects the icon (e.g., clicks on the icon using a mouse), then the icon may toggle "on" to indicate that the full header information of the received email message will be included in the forwarded email message. If the user again selects the icon (e.g., clicks on the icon a second time using the mouse), then the icon may toggle "off" to indicate that the full header information of the received email message will not be included in the forwarded email message. In an example embodiment, the icon may be displayed as a check-box, which may be checked on or off depending on whether or not the user wishes to include the full header information of the received email message in the forwarded email message. As shown in FIG. 1A, the user does not select the user-selectable option 134a, thereby indicating that the user has chosen not to include the full header information of the received email message in the forwarded email message.

FIG. 1B shows the user interface 102 of FIG. 1A with the user-selectable option 134b being selected by the user. Thus, as shown in FIG. 1B, the message-forwarding screen 104 indicates that the user has chosen to include the full header information of the received email message in the forwarded email message. In the embodiment of FIG. 1B, even though the user selects the user-selectable option 134b, the full email header is still not displayed to the user in the text window 128. Thus, in the embodiment of FIG. 1B, when the user is forwarding the received email message with the full header information of the received email message, the full header information is still not displayed to the user. This provides a cleaner text window 128 for the user so that the user may include other text messages to the recipient of the forwarded email. However, it should be understood that other embodiments may display the full header information in the text window 128.

As described above, in conventional email systems, the full header information of the received email message is available to the user. However, conventional email systems substitute the full email header information with a truncated header. The user-selectable option of FIGS. 1A and 1B, however, prohibits the email system from removing or truncating the full header information, depending on the setting of the user-selectable option. In this regard, one embodiment of the system comprises email software that determines whether or not the user has selected the option to include the full header information of the received email message in the forwarded email message. Additionally, the email software is configured to include the full header information of the received email message in the forwarded email message if it is determined that the use has selected the option to include the full header information. Similarly, the email software is configured to not include the full header information of the received email message in the forwarded email message if it is determined that the use has not selected the option to include the full header information.

Figure 2A:
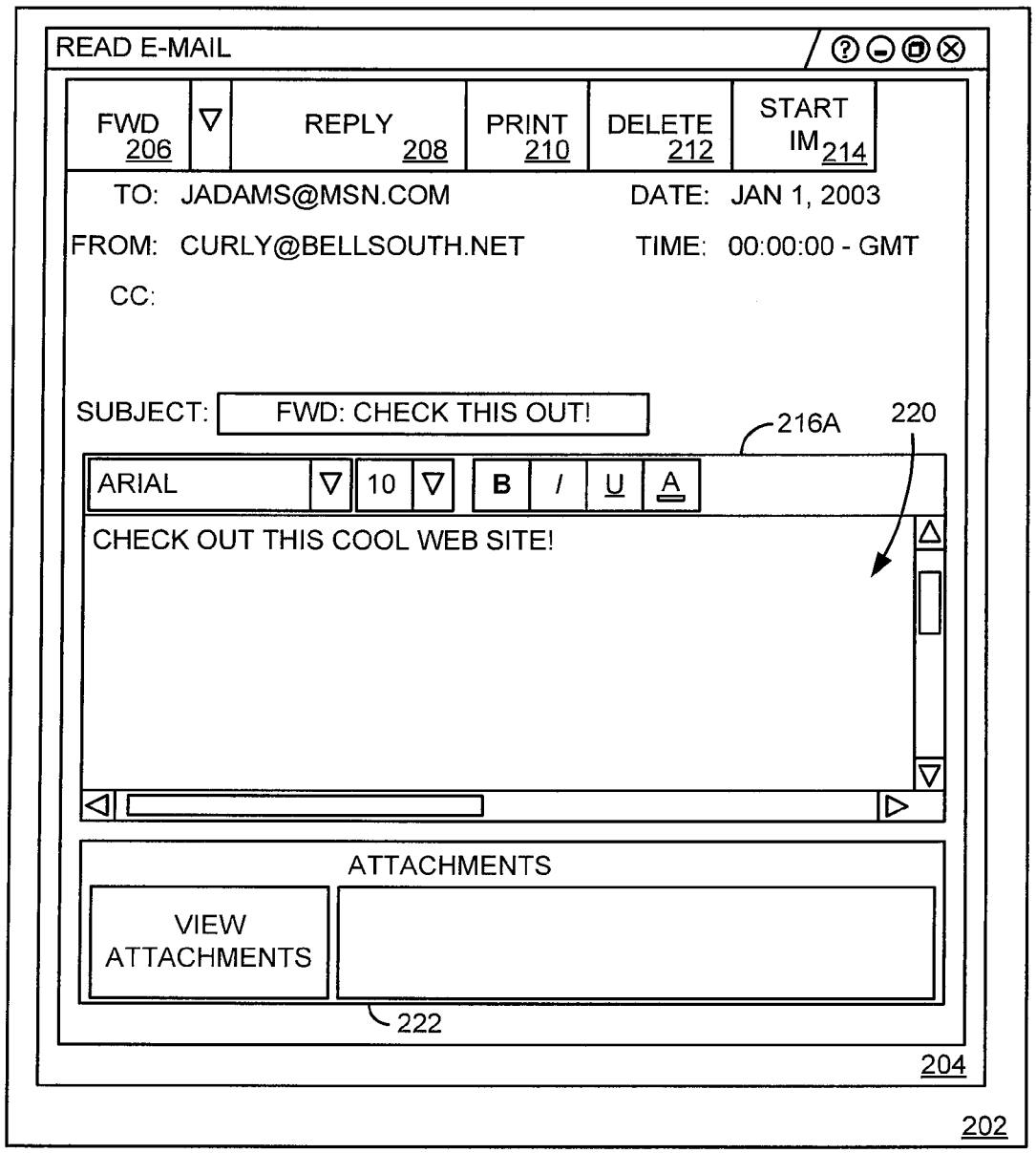
FIG. 2A is a diagram showing a user interface having the forwarded email message without the full header information.

FIG. 2A is a diagram showing a user interface 202 of a recipient's email system (not shown) having the forwarded email message without the full header information. In this regard, the user interface 202 of FIG. 2A shows the forwarded email message with the user-selectable option 134a "off" (or not selected) as shown in FIG. 1B. As shown in FIG. 2A, the user interface 202 comprises a read window 204 from which the recipient may read the forwarded email message. Since, as shown in FIG. 1B, the email message was forwarded to the recipient without the full header information, the read email window 204 displays text of the forwarded email message 220 without the full header information.

Figure 2B:
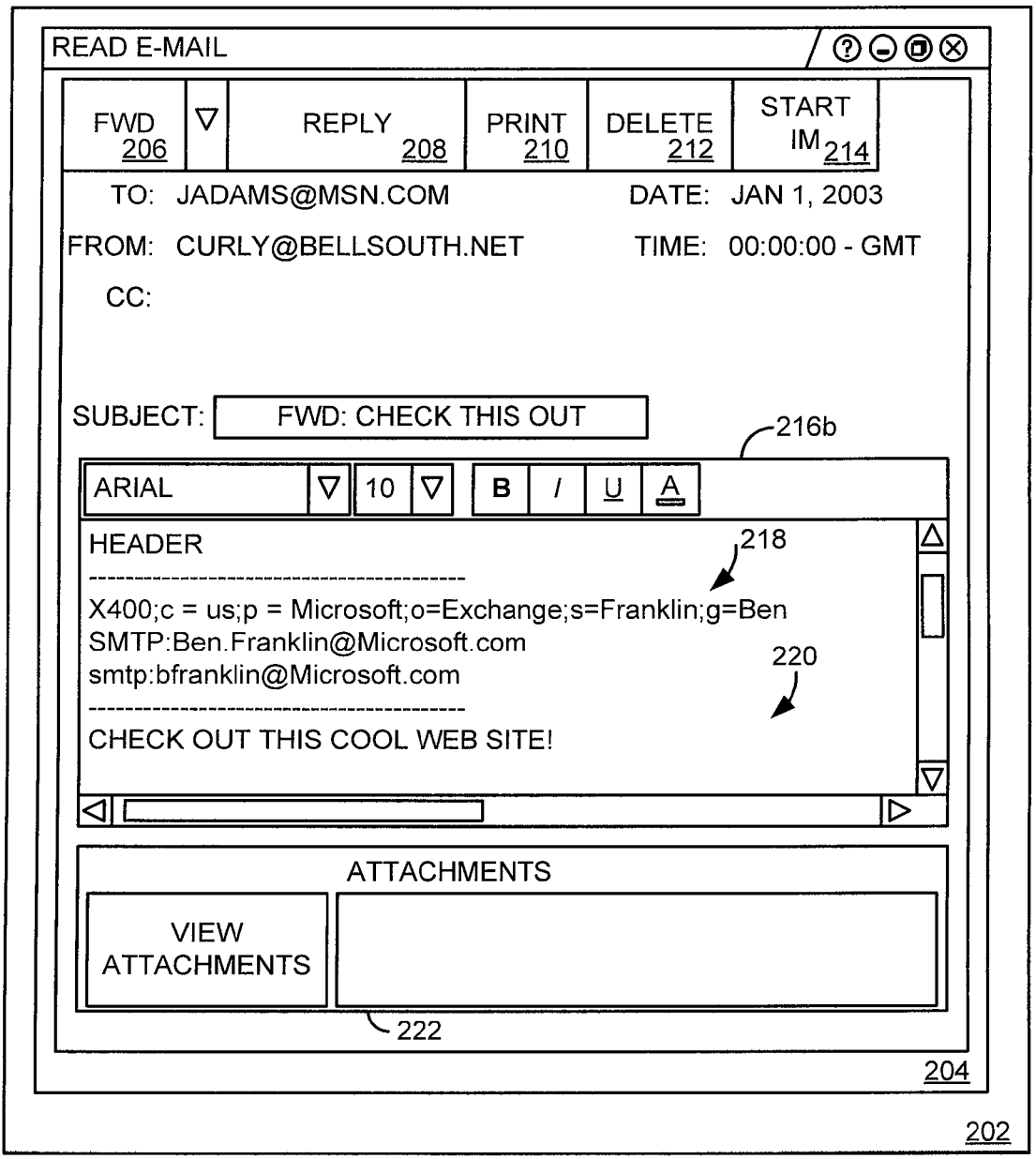
FIG. 2B is a diagram showing a user interface having the forwarded email message with the full header information.

FIG. 2B is a diagram showing a user interface 202 of a recipient's email system (not shown) having the forwarded email message with the full header information. In this regard, the user interface 202 of FIG. 2B shows the forwarded email message with the user-selectable option 134b "on" (or selected) as shown in FIG. 1A. As shown in FIG. 2B, the user interface 202 comprises a read window 204 from which the recipient may read the forwarded email message. Since, as shown in FIG. 1A, the email message was forwarded to the recipient with the full header information, the read email window 204 displays the forwarded email message 220 along with the full header information 218 included in the text of the email message. In another embodiment, the full header information 218 may be attached to the email message as an attachment, rather than being embedded in the email message as text. Regardless of whether the full header information 218 is attached as an attachment or embedded as text, the full header information 218 is available to the recipient.

Thus, as shown in FIGS. 1A through 2B, by having a user-selectable option 134 an email message forwarding screen 104, a user is able to forward the full header information 218 to a recipient without the inconvenience of manually finding, copying, and pasting (or attaching) the full header information 218. In this regard, any potential errors that may have previously arisen from manually finding, copying, or pasting are now obviated.

Figure 3:
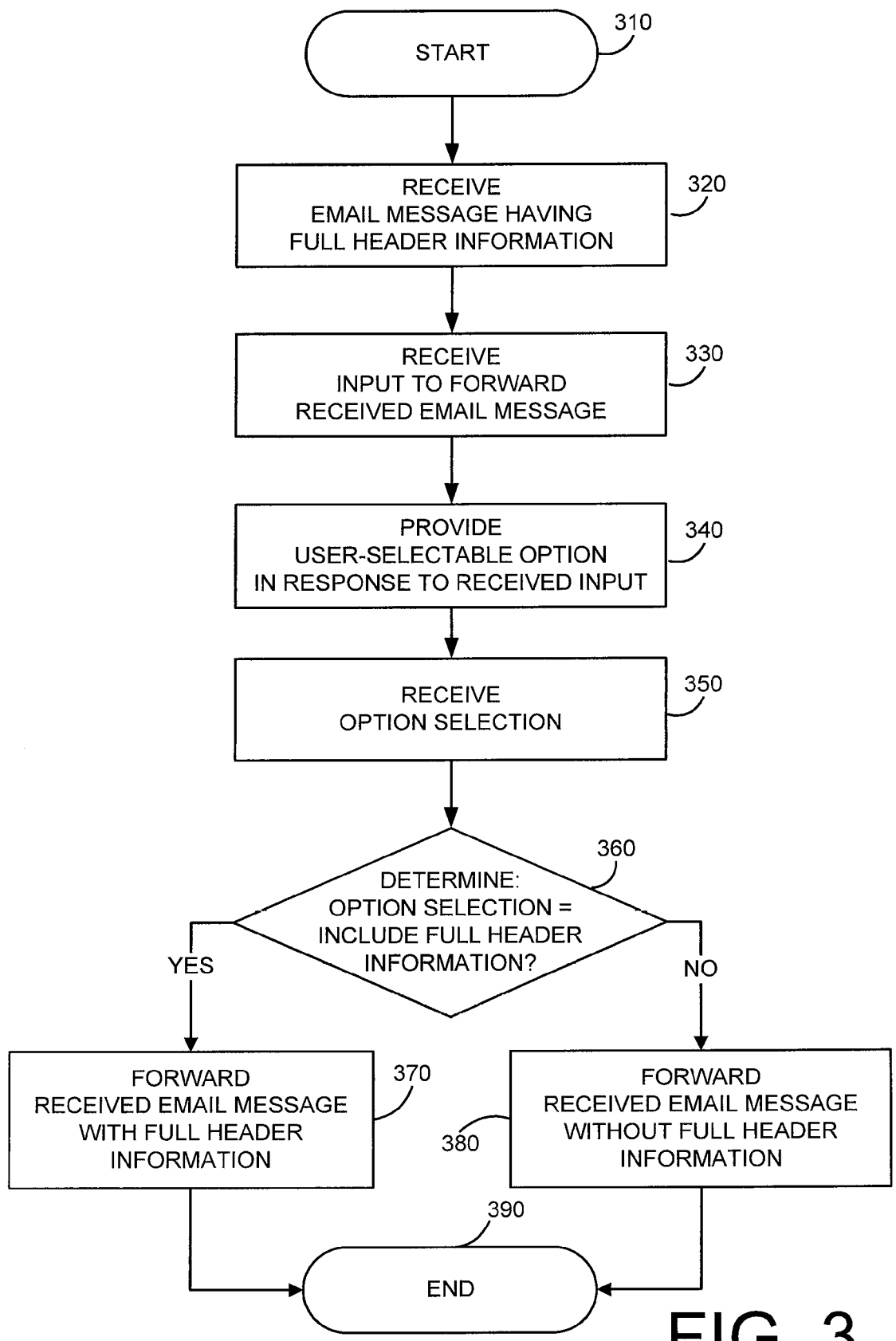
FIG. 3 is a flowchart showing one embodiment of a method for forwarding a received email message with the full header information.

FIG. 3 is a flowchart showing one embodiment of a method for forwarding a received email message with the full header information. As shown in FIG. 3, one embodiment of the method begins when a user receives (320) an email message having full header information. If the user chooses to forward the email message, then an input is received (330), which indicates that the user has chosen to forward the received email message. In one embodiment, the input is the selection of a message forward button (not shown) on the user's email read window (not shown).

Upon receiving (330) the input to forward the received email message, a user-selectable option is provided (340). In one embodiment, the user selectable option may be an icon configured to toggle between the option to include the full header information and the option to not include the full header information. In an example embodiment, the icon may be displayed as a check-box, which may be checked "on" or "off" depending on whether or not the user wishes to include the full header information of the received email message in the forwarded email message.

When the user selects either the user-selectable option to include the full header information or not include the full header information, the selection of the option is received (350), and it is determined (360) whether or not the user has selected the option to include the full header information of the received email message in the forwarded email message. If it is determined (360) that the user has selected to include the full header information of the received email message in the forwarded email message, then the received email message is forwarded (370) with the full header information of the received email message included in the forwarded email message. This may be done by attaching the full header information as an attachment, or by embedding the full header information into the text of the forwarded email message. If it is determined (360) that the user has selected to not include the full header information of the received email message in the forwarded email message, then the received email message is forwarded (380) without the full header information of the received email message included in the forwarded email message. Thus, in one embodiment, if the user has selected to not include the full header information of the received email message in the forwarded email message, then the received email message is forwarded with a truncated header, as in conventional email systems.

Figure 4:
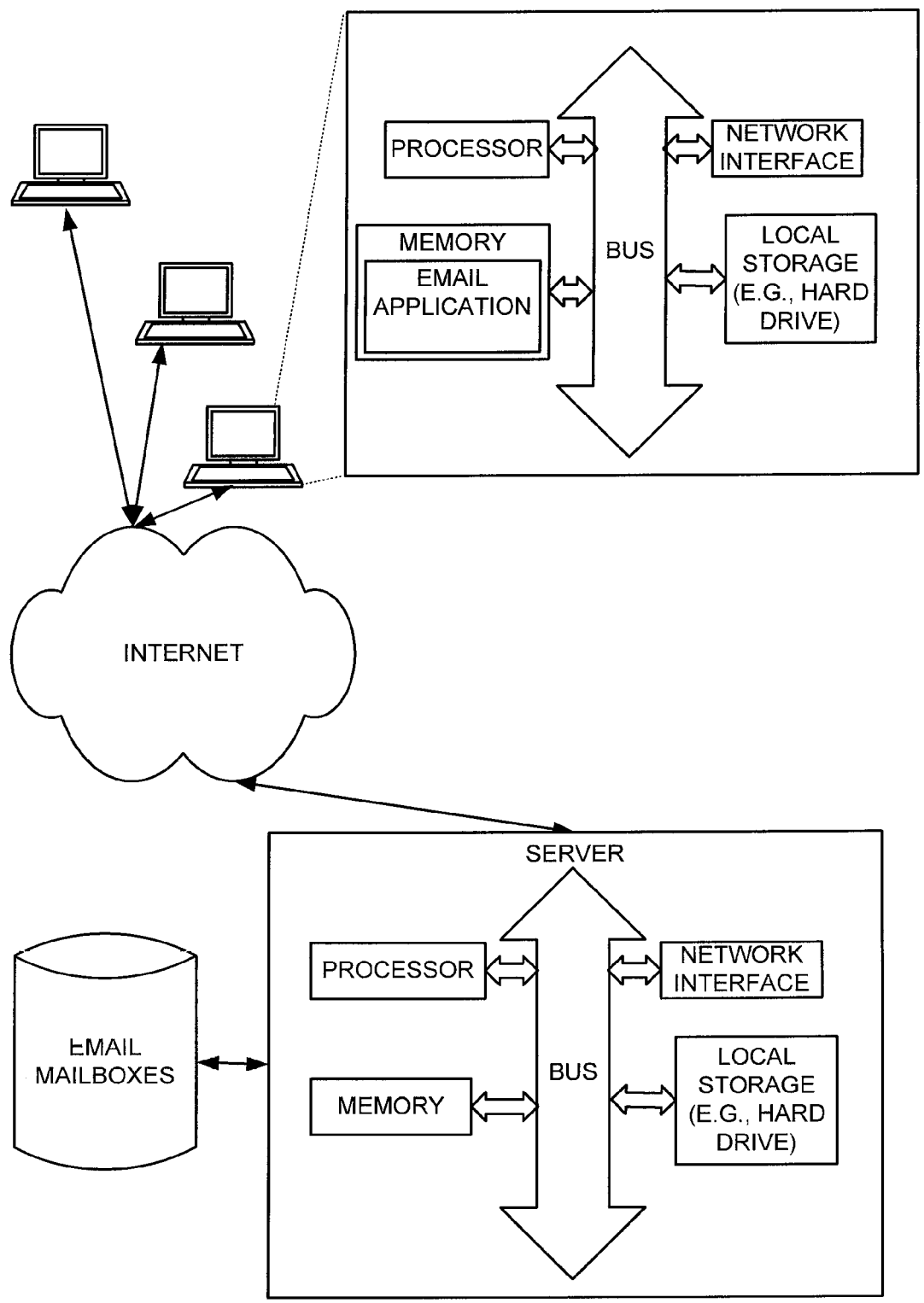
FIG. 4 is a diagram of an email application, as discussed with reference to FIGS. 1A, 1B, 2A, and 2B.

FIG. 4 is a diagram of an email application, as discussed with reference to FIGS. 1A, 1B, 2A, and 2B.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The email software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), all erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, while the user-selectable option in FIGS. 1A and 1B is shown as a check box that may be selected or un-selected by the user, it will be clear to one of ordinary skill in the art that other mechanisms may be employed to provide the user with a user-selectable option to either include or not include the full header of a received email message in a forwarded email message. All such changes, modifications, and alterations should therefore be seen as within the scope of the disclosure.

What is claimed is:

1. In an email messaging system, a method comprising:
    receiving an email message having full header information;
    receiving an input to forward the received email message;
    providing a text prompt configured to receive text from a user in the form of a body portion of a forwarding message; and
    providing user-selectable options in response to receiving the input to forward the received email message, the user-selectable options comprising:
        an option to include the full header information of the received email message in a forwarded email message; and
        an option to not include the full header information of the received email message in a forwarded email message,
    wherein, in response to selection of the option to include the full header information of the received email message in the forwarded email message, the text prompt is configured to not display the header information to the user and provide the full header information as an email attachment to the forwarded email message.

2. The method of claim 1, wherein the providing user-selectable options comprises:
    providing a user-selectable icon configured to toggle between the option to include the full header information and the option to not include the full header information in response to being selected by a user.

3. The method of claim 1, further comprising:
    receiving from the user the option to include the full header information of the received email message in a forwarded email message; and
    forwarding the received email message with the full header information of the received email message in response to receiving the option to include the full header information of the received email message.

4. The method of claim 1, further comprising:
    receiving from the user the option to not include the full header information of the received email message in a forwarded email message; and
    forwarding the received email message without the full header information of the received email message in response to receiving the option to not include the full header information of the received email message.

5. An email messaging system comprising:
    a processor;
    a computer-readable storage medium;
    a user interface having an email message forwarding screen, the email message forwarding screen including a text prompt, the text prompt configured to receive text from a user in the form of a body portion of a forwarding message; and
    a user selectable option on the email message-forwarding screen, the user-selectable option being selected from a group consisting of:
        an option to include the full header information of a received email message in a forwarded email message; and
        an option to not include the full header information of a received email message in a forwarded email message,
    wherein, in response to selection of the option to include the full header information of the received email message in the forwarded email message, the text prompt is configured to not display the header information to the user and provide the full header information as an email attachment to the forwarded email message.

6. The system of claim 5, wherein the user-selectable option is an icon being configured to toggle between the option to include the full header information and the option to not include the full header information in response to being selected by the user.

7. A computer-readable storage medium comprising:
    computer-readable code adapted to instruct a programmable device to receive an email message having full header information;
    computer-readable code adapted to instruct a programmable device to receive an input to forward the received email message;
    computer-readable code adapted to instruct a programmable device to provide a text prompt configured to receive text from a user in the form of a body portion of a forwarding message; and
    computer-readable code adapted to instruct a programmable device to provide user-selectable options in response to receiving the input to forward the received email message, the user-selectable options comprising:
        an option to include the full header information of the received email message in a forwarded email message; and
        an option to not include the full header information of the received email message in a forwarded email message,
    wherein, in response to selection of the option to include the full header information of the received email message in the forwarded email message, the text prompt is configured to not display the header to the user and provide the full header information as an email attachment to the forwarded email message.

8. The computer-readable storage medium of claim 7, further comprising:
    computer-readable code adapted to instruct a programmable device to receive the option to include the full header information of the received email message in a forwarded email message; and
    computer-readable code adapted to instruct a programmable device to forward the received email message with the full header information of the received email message in response to receiving the option to include the full header information of the received email message.

9. The computer-readable storage medium of claim 7, further comprising:
    computer-readable code adapted to instruct a programmable device to receive the option to not include the full header information of the received email message in a forwarded email message; and computer-readable code adapted to instruct a programmable device to forward the received email message without the full header information of the received email message in response to receiving the option to not include the full header information of the received email message.

10. An email messaging system comprising:
a processor; and
a storage component comprising:
  logic adapted to receive an email message having full header information;
  logic adapted to receive an input to forward the received email message;
  logic adapted to provide a text prompt configured to receive text from a user in the form of a body portion of a forwarding message; and
  logic adapted to provide user-selectable options in response to receiving the input to forward the received email message, the user-selectable options comprising:
    an option to include the full header information of the received email message in a forwarded email message; and
    an option to not include the full header information of the received email message in a forwarded email message,
  wherein, in response to selection of the option to include the full header information of the received email message in the forwarded email message, the text prompt is configured to not display the header information to the user and provide the full header information as an email attachment to the forwarded email message.

11. The system of claim 10, the storage component further comprising:
  logic adapted to receive the option to include the full header information of the received email message in a forwarded email message; and
  logic adapted to forward the received email message with the full header information of the received email message in response to receiving the option to include the full header information of the received email message.

12. The system of claim 10, the storage component further comprising:
  logic adapted to receive the option to not include the full header information of the received email message in a forwarded email message; and
  logic adapted to forward the received email message without the full header information of the received email message in response to receiving the option to not include the full header information of the received email message.

13. An email messaging system comprising:
a processor; and
a storage component, comprising:
  means for receiving an email message having full header information;
  means for receiving an input to forward the received email message;
  means for providing a text prompt configured to receive text from a user in the form of a body portion of a forwarding message; and
  means for providing user-selectable options in response to receiving the input to forward the received email message, the user-selectable options comprising:
    an option to include the full header information of the received email message in a forwarded email message; and
    an option to not include the full header information of the received email message in a forwarded email message,
  wherein, in response to selection of the option to include the full header information of the received email message in the forwarded email message, the text prompt is configured to not display the header information to the user and provide the full header information as an email attachment to the forwarded email message.

14. The system of claim 13, wherein the means for providing user-selectable options comprises:
  means for providing user-selectable icon configured to toggle between the option to include the full header information and the option to not include the full header information in response to being selected by the user.

15. The system of claim 13, the storage component further comprising:
  means for receiving from the user the option to include the full header information of the received email message in a forwarded email message; and
  means for forwarding the received email message with the full header information of the received email message in response to receiving the option to include the full header information of the received email message.

16. The system of claim 13, the storage component further comprising:
  means for receiving from the user the option to not include the full header information of the received email message in a forwarded email message; and
  means for forwarding the received email message without the full header information of the received email message in response to receiving the option to not include the full header information of the received email message.

* * * * *